United States Patent Office 3,470,158
Patented Sept. 30, 1969

3,470,158
6,7-ETHYLENE AND 6,7-SUBSTITUTED ETHYLENE DERIVATIVES OF THE PREGNANE SERIES
John A. Zderic, Mexico City, Mexico, assignor to Syntex Corporation, Panama, Panama, a corporation of Panama
No Drawing. Continuation-in-part of application Ser. No. 544,710, Apr. 25, 1966. This application Apr. 10, 1967, Ser. No. 629,419
Int. Cl. C07c *169/34, 169/36, 173/00*
U.S. Cl. 260—239.55          18 Claims

ABSTRACT OF THE DISCLOSURE 6,7-ethylene and 6,7-substituted ethylene derivatives of the pregnane series having corticoid activities are prepared by the photochemical cycloaddition of an olefin of the formula:

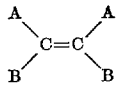

wherein A is hydrogen or fluoro and B is hydrogen, fluoro, chloro, methyl or phenyl, to a 3-keto-$\Delta^{4,6}$-diene of the pregnane series.

---

This is a continuation-in-part of application Ser. No. 544,710, filed Apr. 25, 1966, now abandoned.

This invention relates to novel cyclopentanophenanthrene derivatives and to a process for the production thereof. More specifically, this invention relates to novel 6,7-ethylene and 6,7-substituted ethylene derivatives of the pregnane series.

The compounds of the present invention are represented by the following formula:

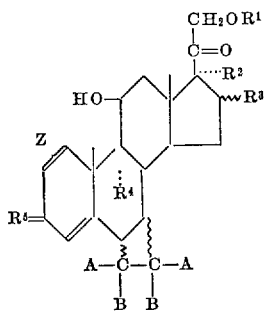

wherein:
$R^1$ is hydrogen, tetrahydropyran-2′-yl, phosphono, or a hydrocarbon carboxylic acyl group containing less than 12 carbon atoms;
$R^2$ is hydrogen, hydroxy or a hydrocarbon carboxylic acyloxy group of less than 12 carbon atoms;
$R^3$ is hydrogen, α-methyl, β-methyl, α-fluoro, α-hydroxy or a hydrocarbon carboxylic acyloxy group of less than 12 carbon atoms;
$R^2$ and $R^3$ taken together are the group

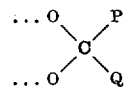

wherein:
P is hydrogen or lower alkyl and Q is hydrogen, lower alkyl or aryl;
$R^4$ is hydrogen or fluoro;
$R^5$ is keto or the group

wherein $R^6$ is hydrogen, tetrahydropyran-2′-yl or a hydrocarbon carboxylic acyl group of less than 12 carbon atoms;
Z is a carbon-carbon single bond or a carbon-carbon double bond, $R^5$ being keto when Z is a carbon-carbon double bond;
A is hydrogen or fluoro; and
B is hydrogen, fluoro, chloro, methyl or phenyl.

The wavy line ⌇ at C–6 and C–7 indicates both alpha and beta configurations for the 6,7-ethylene and 6,7-substituted ethylene derivatives of the present invention, i.e., the 6α,7α-ethylene and 6α,7α-substituted ethylene derivatives of the pregnane series along with the 6β,7β-ethylene and 6β,7β-substituted ethylene derivatives of the pregnane series.

The hydrocarbon carboxylic acyl and acyloxy groups of the present invention contain less than 12 carbon atoms and are of a straight, branched, cyclic or cyclic-aliphatic chain structure. This structure is saturated, unsaturated, or aromatic and optionally substituted by functional groups such as hydroxy, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate, and the like.

The phosphono group includes the mono or di sodium or potassium salts thereof. By the term "lower alkyl" is meant a straight or branched chain hydrocarbon group containing from one to eight carbon atoms, inclusive, such as methyl, ethyl, isopropyl and the like. By the term "aryl" is meant a group containing one aromatic ring such as phenyl, benzyl, o-, m- or p-tolyl, and the like of up to eight carbon atoms.

The novel compounds of the present invention are cortical hormones with anti-inflammatory and low catabolic activities and are useful in the treatment of rheumatoid arthritis, contact dermatitis, allergies and the like. These compounds can be administered via usual routes for hormonal anti-inflammatory agents, e.g., topically, in pharmaceutically acceptable compositions at dosage rates of from 0.5γ to 5 mg./kg./day. However, dosage rates below or above this range can also be used; the most favorable dosage rate and administration route being conditioned upon the purpose for which it is administered and the response thereto.

The novel compounds of the present invention are prepared in accordance with the following sequence:

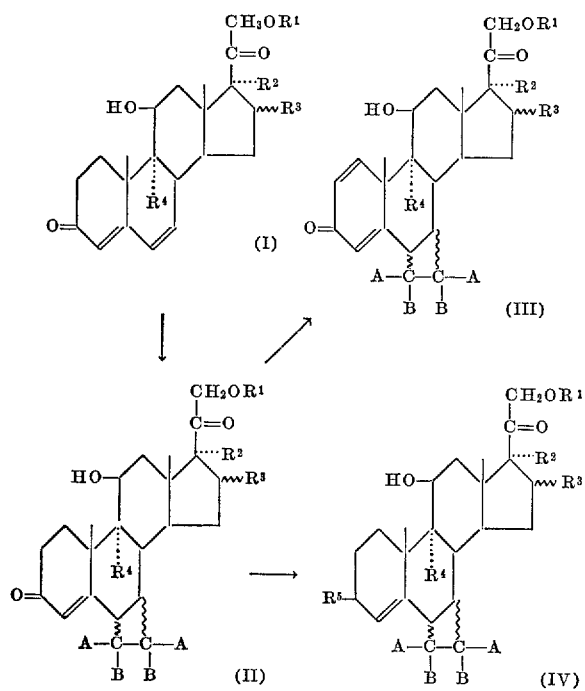

wherein R⁵' is the group

and $R^1$, $R^2$, $R^3$, $R^4$, $R^6$, A and B are as defined hereinabove.

In the practice of the present invention the starting material of Formula I, i.e. an unsubstituted or appropriately substituted 3-keto-$\Delta^{4,6}$-diene, and an olefin of the formula:

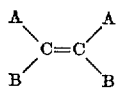

wherein each of A and B is as previously defined, are irradiated with ultraviolet light in an inert organic solvent such as benzene, dioxane and the like or a mixture thereof, to effect the photochemical cycloaddition of the olefin and thereby afford the 6,7-ethylene or 6,7-substituted ethylene cycloaddition shown by Formula II. A preferred choice for the photochemical cycloaddition employs benzene:dioxane as the mixture of inert organic solvent and ultraviolet light of a wavelength of about 270 to about 330 mμ. Preferably, the reaction is performed at room temperature for a period of about 1 to 12 hours. Any suitable source of ultraviolet irradiation of a wavelength of about 270 to about 330 mμ can be employed for the photochemical cycloaddition reaction. Among such sources are commercially available high pressure mercury vapor lamps such as a 70 watt Hanau lamp, a 200 watt Hanovia lamp, and the like.

Under the above conditions, the photochemical cycloaddition of the olefin occurs at the 4,5- and 6,7-double bonds to afford a mixture of 4,5-ethylene or 4,5-substituted ethylene and 6,7-ethylene or 6,7-substituted ethylene products. The orientation of the resulting 4,5-ethylene or 4,5-substituted ethylene group with respect to the steroid nucleus is both alpha and beta, i.e. the products having the 4α,5α-, 4β,5β-, and 4β,5α-configurations. The orientation of the resulting 6,7-ethylene or 6,7-substituted ethylene group with respect to the steroid nucleus is both alpha and beta, i.e. the products having the 6α,7α- and 6β,7β-configurations, the 6α,7α-isomer generally being the predominant product. The mixture of products is routinely separated by a conventional procedure such as by column chromatography to yield the 6α,7α-ethylene-, 6β,7β-ethylene, or the 6α,7α-substituted ethylene- and 6β,7β-substituted ethylene-derivatives of the present invention.

Subsequent to the photochemical cycloaddition, a 3-keto-$\Delta^4$-ene-6,7-cyclo adduct of Formula II is treated with 2,3-dichloro-5,6-dicyanobenzoquinone in dioxane to afford a novel 3-keto-$\Delta^{1,4}$-diene-6,7-cyclo adduct of Formula III. In addition, the 3-keto-$\Delta^4$-ene-6,7-cyclo adduct of Formula II is selectively reduced with sodium borohydride in isopropanol to afford corresponding 3β-hydroxy-$\Delta^4$-ene-6,7-cyclo adduct of Formula IV which is subsequently treated with dihydropyran and an acid catalyst such as p-toluenesulfonic acid either alone or in an inert organic cosolvent such as benzene or with a hydrocarbon carboxylic acid anhydride and pyridine in an inert solvent to yield a corresponding 3β-(tetrahydropyran-2'-yloxy) or a corresponding 3β-acyloxy-6,7-cyclo adduct, respectively, each of which is included in Formula IV.

As an alternative to the above outlined reaction sequence, the starting material of Formula I can contain a free hydroxy group at C-16, C-17 and/or C-21 which upon completion of the photochemical cycloaddition reaction can then be elaborated. Thus, for example, a 21-hydroxy group in a compound of Formula II is treated with methanesulfonyl chloride in the presence of pyridine and an inert organic solvent such as benzene and subsequently with sodium iodide to afford a 21-iodo intermediate. This 21-iodo intermediate is treated with silver monobasic phosphate in acetonitrile to yield a 21-phosphate. Alternatively, treatment of a 21-hydroxy compound of Formula II with dihydropyran or with a hydrocarbon carboxylic acid anhydride, as mentioned hereinabove, leads to the formation of a corresponding 21-(tetrahydropyran-2'-yloxy) or 21-acyl substituent. A 17α-acyloxy group is readily introduced by treating a corresponding 17α-hydroxy group with a hydrocarbon carboxylic anhydride in the presence of an acid catalyst such as p-toluenesulfonic acid and in an inert organic solvent such as benzene.

The $\Delta^{4,6}$-diene starting materials of Formula I are conveniently prepared by treating a corresponding 3-keto-$\Delta^4$-ene compound with chloranil in a solvent such as t-butanol, xylene or the like under reflux for a period of 1 to 12 hours.

The following examples are set forth to illustrate but are not intended to limit the scope of the present invention.

Example 1

A mixture of 2.0 g. of 11β,17α,21-trihydroxypregna-4,6-diene-3,20-dione in 70 ml. of dioxane and 70 ml. of benzene in a Pyrex container, is irradiated with a 200 watt high pressure mercury vapor lamp at room temperature for a period of several hours while bubbling ethylene through the solution. At the end of the reaction time, which is followed by U.V. spectra, the mixture is evaporated in vacuo to dryness to furnish a residue containing a 4α,5α-ethylene adduct, a 4β,5β-ethylene adduct, a 4β,5α-ethylene adduct, a 6α,7α-ethylene adduct and a 6β,7β-ethylene adduct. The residue is separated by chromatography on silica eluting with ethyl acetate:benzene to yield 6α,7α-ethylene-11β,17α,21-trihydroxypregn-4-ene-3,20-dione and 6β,7β-ethylene-11β,17α,21-trihydroxypregn-4-ene-3,20-dione, each of which is recrystallized from methanol:methylene chloride.

Utilizing the above procedure, the starting materials, namely:

9α-fluoro-11β,17α-dihydroxy-21-acetoxypregna-4,6-diene-3,20-dione;
11β,16α,17α,21-tetrahydroxypregna-4,6-diene-3,20-dione;
11β,17α,21-trihydroxy-16α-methylpregna-4,6-diene-3,20-dione;
9α-fluoro-11β,16α,17α,21-tetrahydroxypregna-4,6-diene-3,20-dione;
9α-fluoro-11β,17α,21-trihydroxy-16α-methylpregna-4,6-diene-3,20-dione;
11β,17α,21-trihydroxy-16α-fluoropregna-4,6-diene-3,20-dione;
11β,17α,21-trihydroxy-16β-methylpregna-4,6-diene-3,20-dione;
11β,21-dihydroxy-16α-methylpregna-4,6-diene-3,20-dione; and
9α-fluoro-11β,21-dihydroxy-16α-methylpregna-4,6-diene-3,20-dione;

are converted to the 6α,7α-ethylene and 6β,7β-ethylene compounds, namely

6α,7α-ethylene-9α-fluoro-11β,17α-dihydroxy-21-acetoxypregn-4-ene-3,20-dione, and the 6β,7β-isomer;
6α,7α-ethylene-11β,16α,17α,21-tetrahydroxypregn-4-ene-3,20-dione, and the 6β,7β-isomer;
6α,7α-ethylene-11β,17α,21-trihydroxy-16α-methylpregn-4-ene-3,20-dione, and the 6β,7β-isomer;
6α,7α-ethylene-9α-fluoro-11β,16α,17α,21-tetrahydroxypregn-4-ene-3,20-dione, and the 6β,7β-isomer;
6α,7α-ethylene-9α-fluoro-11β,17α,21-trihydroxy-16α-methylpregn-4-ene-3,20-dione, and the 6β,7β-isomer;
6α,7α-ethylene-11β,17α,21-trihydroxy-16α-fluoropregn-4-ene-3,20-dione, and the 6β,7β-isomer;
6α,7α-ethylene-11β,17α,21-trihydroxy-16β-methylpregn-4-ene-3,20-dione, and the 6β,7β-isomer;
6α,7α-ethylene-11β,21-dihydroxy-16α-methylpregn-4-ene-3,20-dione, and the 6β,7β-isomer; and
6α,7α-ethylene-9α-fluoro-11β,21-dihydroxy-16α-methylpregn-4-ene-3,20-dione, and the 6β,7β-isomer.

Example 2

Utilizing the procedure of Example 1 with the exception of substituting tetrafluoroethylene in place of ethylene, the corresponding 6α,7α-tetrafluoroethylene and 6β,7β-tetrafluoroethylene compounds are obtained, namely:

6α,7α-tetrafluoroethylene-11β,17α,21-trihydroxypregn-4-ene-3,20-dione, and the 6β,7β-isomer;
6α,7α-tetrafluoroethylene-11β,16α,17α,21-tetrahydroxypregn-4-ene-3,20-dione, and the 6β,7β-isomer;
6α,7α-tetrafluoroethylene-11β,17α,21-trihydroxy-16α-methylpregn-4-ene-3,20-dione, and the 6β,7β-isomer;
6α,7α-tetrafluoroethylene-9α-fluoro-11β,16α,17α,21-tetrahydroxypregn-4-ene-3,20-dione, and the 6β,7β-isomer;
6α,7α-tetrafluoroethylene-9α-fluoro-11β,17α,21-trihydroxy-16α-methylpregn-4-ene-3,20-dione, and the 6β,7β-isomer;
6α,7α-tetrafluoroethylene-11β,17α,21-trihydroxy-16α-fluoropregn-4-ene-3,20-dione, and the 6β,7β-isomer;
6α,7α-tetrafluoroethylene-11β,17α,21-trihydroxy-16β-methylpregn-4-ene-3,20-dione, and the 6β,7β-isomer;
6α,7α-tetrafluoroethylene-11β,21-dihydroxy-16α-methylpregn-4-ene-3,20-dione, and the 6β,7β-isomer;
6α,7α-tetrafluoroethylene-9α-fluoro-11β,21-dihydroxy-16α-methylpregn-4-ene-3,20-dione, and the 6β,7β-isomer; and
6α,7α-tetrafluoroethylene-9α-fluoro-11β,17α-dihydroxy-21-acetoxypregn-4-ene-3,20-dione, and the 6β,7β-isomer.

Example 3

Utilizing the procedure of Example 1, the following starting materials are reacted with the following olefins to afford the 6α,7α-substituted ethylene and 6β,7β-substituted ethylene derivatives as indicated below.

| Starting material | Olefin | Final product |
|---|---|---|
| 11β,17α,21-trihydroxy-pregna-4,6-diene-3,20-dione. | 1,2-difluoro-ethylene. | 6α,7α-(1',2'-difluoro)ethylene-11β,17α,21-trihydroxypregn-4-ene-3,20-dione, and the 6β,7β-isomer. |
| 11β,16α,17α,21-tetrahydroxypregna-4,6-diene-3,20-dione. | ...do... | 6α,7α-(1',2'-difluoro)ethylene-11β,16α,17α,21-tetrahydroxypregn-4-ene-3,20-dione, and the 6β,7β-isomer. |
| 9α-fluoro-11β,17α,21-trihydroxypregna-4,6-diene-3,20-dione. | Butene-2 | 6α,7α-(1',2'-dimethyl)ethylene-9α-fluoro-11β,17α,21-trihydroxypregn-4-ene-3,20-dione, and the 6β,7β-isomer. |
| 11β,17α,21-trihydroxy-16α-methylpregna-4,6-diene-3,20-dione. | 1,2-dichloro-1,2-difluoro-ethylene. | 6α,7α-(1',2'-dichloro-1',2'-difluoro)ethylene-11β,17α,21-trihydroxy-16α-methylpregn-4-ene-3,20-dione, and the 6β,7β-isomer. |
| 9α-fluoro-11β,17α,21-trihydroxypregna-4,6-diene-3,20-dione. | 2,3-difluoro-butene-2. | 6α,7α-(1',2'-difluoro-1',2'-dimethyl)ethylene-11β,17α,21-trihydroxypregn-4-ene-3,20-dione, and the 6β,7β-isomer. |
| 9α-fluoro-11β,17α-dihydroxy-21-acetoxypregna-4,6-diene-3,20-dione. | 1,2-difluoro-ethylene. | 6α,7α-(1',2'-difluoro)ethylene-9α-fluoro-11β,17α-dihydroxy-21-acetoxypregn-4-ene-3,20-dione, and the 6β,7β-isomer. |

Example 4

A mixture of 0.5 g. of 6α,7α-ethylene-11β,17α,21-trihydroxypregn-4-ene-3,20-dione, 10 ml. of dioxane and 0.35 g. of 2,3-dichloro-5,6-dicyano-1,4-benzoquinone is refluxed for ten hours. The mixture is then cooled, filtered and evaporated to dryness. The residue is dissolved in acetone and this solution is then filtered through 10 g. of alumina and concentrated to yield 6α,7α-ethylene-11β,17α,21-trihydroxypregna-1,4-diene-3,20-dione which is further purified by recrystallization from acetone:hexane.

By repeating the above procedure with 6β,7β-ethylene-11β,17α,21-trihydroxypregn-4-ene-3,20-dione, there is obtained the corresponding 6β,7β-ethylene-11β,17α,21-trihydroxypregna-1,4-diene-3,20-dione.

Utilizing the same procedure, the final products of Examples 1–3, inclusively, are converted to the pregna-1,4-dienes of the present invention. Included among these are the following:

6α,7α-ethylene-11β,17α,21-trihydroxy-16α-methylpregna-1,4-diene-3,20-dione, and the 6β,7β-isomer;
6α,7α-tetrafluoroethylene-11β,17α,21-trihydroxy-16α-methylpregna-1,4-diene-3,20-dione, and the 6β,7β-isomer;
6α,7α-ethylene-9α-fluoro-11β,16α,17α,21-tetrahydroxypregna-1,4-diene-3,20-dione, and the 6β,7β-isomer;
6α,7α-ethylene-11β,16α,17α,21-tetrahydroxypregna-1,4-diene-3,20-dione, and the 6β,7β-isomer;
6α,7α-tetrafluoroethylene-11β,16α,17α,21-tetrahydroxypregna-1,4-diene-3,20-dione, and the 6β,7β-isomer;
6α,7α-tetrafluoroethylene-9α-fluoro-11β,16α,17α,21-tetrahydroxypregna-1,4-diene-3,20-dione, and the 6β,7β-isomer;
6α,7α-tetrafluoroethylene-11β,17α,21-trihydroxy-16α-fluoropregna-1,4-diene-3,20-dione, and the 6β,7β-isomer;
6α,7α-tetrafluoroethylene-11β,17α,21-trihydroxy-16β-methylpregna-1,4-diene-3,20-dione, and the 6β,7β-isomer;
6α,7α-ethylene-9α-fluoro-11β,17α,21-trihydroxy-16α-methylpregna-1,4-diene-3,20-dione, and the 6β,7β-isomer;
6α,7α-ethylene-11β,21-dihydroxy-16α-methylpregna-1,4-diene-3,20-dione, and the 6β,7β-isomer;
6α,7α-ethylene-9α-fluoro-11β,21-dihydroxy-16α-methylpregna-1,4-diene-3,20-dione, and the 6β,7β-isomer;
6α,7α-tetrafluoroethylene-11β,21-dihydroxy-16α-methylpregna-1,4-diene-3,20-dione, and the 6β,7β-isomer; and 6α,7α-tetrafluoroethylene-9α-fluoro-11β,21-dihydroxy-16α-methylpregna-1,4-diene-3,20-dione, and the 6β,7β-isomer.

Example 5

To 120 ml. of acetone containing 1 g. of 6α,7α-ethylene-11β,16α,17α,21 - tetrahydroxypregna - 1,4-diene-3,20-dione are added 30 drops of 70% perchloric acid. The resulting mixture is allowed to stand for one hour at room temperature, then 30 drops of pyridine are added and the mixture is evaporated to dryness under reduced pressure. Thirty milliliters of water are added to the residue and this mixture is extracted several times with ethyl acetate. The combined ethyl acetate extracts are washed to neutrality with water, dried over sodium sulfate and evaporated to dryness. The residue upon trituration with methanol yields 6α,7α-ethylene-11β,21 - dihydroxy - 16α,17α-isopropylidenedioxypregna-1,4 - diene - 3,20 - dione which is recrystallized from methanol.

By repeating the above procedure with the 6β,7β-isomer, there is obtained the corresponding 6β,7β-ethylene - 11β,21 - dihydroxy - 16α,17α - isopropylidenedioxypregna-1,4-diene-3,20-dione.

Utilizing the same procedure, other 16α,17α-dihydroxy compounds are converted to the 16α,17α-isopropylidenedioxy compounds, among which are the following:

6α,7α-ethylene-9α-fluoro-11β,21-dihydroxy-16α,17α-isopropylidenedioxypregna-1,4-diene-3,20-dione, and the 6β,7β-isomer;
6α,7α-tetrafluoroethylene-11β,21-dihydroxy-16α,17α-isopropylidenedioxypregna-1,4-diene-3,20-dione, and the 6β,7β-isomer;
6α,7α-tetrafluoroethylene-9α-fluoro-11β,21-dihydroxy-16α,17α-isopropylidenedioxypregna-1,4-diene-3,20-dione, and the 6β,7β-isomer; and
6α,7α-(1′,2′-dichloro)ethylene-11β,21-dihydroxy-16α,17α-isopropylidenedioxypregna-1,4-diene-3,20-dione, and the 6b,7β-isomer.

Example 6

A mixture of 1 g. of 6α,7α-ethylene-11β,17α,21-trihydroxy16α-methylpregna-1,4-diene-3,20-dione in 5 ml. of pyridine and 0.5 g. of methanesulfonyl chloride is allowed to stand at room temperature for 24 hours and is then diluted with water and filtered. The solid thus collected is dried and recrystallized from acetone:hexane to yield 6α,7α-ethylene-11β,17α-dihydroxy-16α-methyl-21-methanesulfonyloxypregna-1,4-diene-3,20-dione.

To a stirred mixture of 1 g. of the latter compound in 10 ml. of dry acetone is added 1 g. of sodium iodide. The mixture is allowed to stand at room temperature for four hours, and then filtered. The filtrate is evaporated to dryness to yield 6α,7α-ethylene-11β,17α-dihydroxy-16α-methyl-21-iodopregna-1,4-diene-3,20-dione.

A mixture of the 21-iodo compound and 1.1 molar equivalents of silver monobasic phosphate in 60 ml. of acetonitrile is heated at reflux for two hours. The mixture is then filtered and the filtrate is evaporated to dryness to yield the 21-phosphate of 6α,7α-ethylene-11β,17α,21-trihydroxypregna-1,4-diene-3,20-dione which may be crystallized from methanol:ethyl acetate. This product, dissolved in methanol, can be titrated with aqueous sodium hydroxide to yield the corresponding monosodium and disodium salts.

By repeating the above procedure with the 6β,7β-isomer, there is obtained the corresponding 21-phosphate of 6β,7β-ethylene-11β,17α,21 - trihydroxypregna - 1,4-diene-3,20-dione.

Example 7

A mixture of 1 g. of 6α,7α-ethylene-11β,17α,21-trihydroxypregna-1,4-diene-3,20-dione, 4 ml. of pyridine and 2 ml. of acetic anhydride is allowed to stand at room temperature for 15 hours. The mixture is then poured into ice water and the solid which forms is collected by filtration, washed with water and dried to yield 6α,7α-ethylene - 11β,17α - dihydroxy-21-acetoxypregna-1,4-diene-3,20-dione which can be further purified through recrystallization from acetone:hexane.

By repeating the above procedure with the 6β,7β-isomer there is obtained the corresponding 6β,7β-ethylene-11β,17α-dihydroxy-21-acetoxypregna - 1,4 - diene-3,20-dione.

Utilizing the above procedure, the novel 21-hydroxy compounds described herein, e.g. see Example 4, are treated with acetic anhydride, propionic anhydride, caproic anhydride, enanthic anhydride, and cyclopentylpropionic anhydride, respectively, to obtain the 21-acetates, 21-propionates, 21-caproates, 21-enanthates, and 21-cyclopentylpropionates.

Example 8

Two milliliters of dihydropyran are added to a solution of 1 g. of 6α,7α-tetrafluoroethylene-11β,17α,21-trihydroxypregna-1,4-diene-3,20-dione in 15 ml. of benzene. About 1 ml. is removed by distillation to remove moisture and 0.4 g. of p-toluenesulfonic acid is added to the cooled solution. This mixture is allowed to stand at room temperature for four days, and is then washed with aqueous sodium carbonate solution and water, dried and evaporated. The residue is chromatographed on neutral alumina, eluting with hexane, to yield 6α,7α-tetrafluoroethylene-11β,17α - dihydroxy - 21 - (tetrahydropyran - 2′ - yloxy) pregna-1,4-diene-3,20-dione which is recrystallized from acetone:ether.

By repeating the above procedure with the 6β,7β-isomer, there is obtained the corresponding 6β-7β-tetrafluoroethylene-11β,17α-dihydroxy - 21 - (tetrahydropyran-2′-yloxy)pregna-1,4-diene-3,20-dione.

Utilizing the above procedure, the novel 21-hydroxy compounds described herein, e.g. see Example 3, are treated with dihydropyran to obtain the corresponding 21-(tetrahydropyran-2′-yloxy) compounds.

Example 9

A mixture of 1 g. of 6α,7α-ethylene-11β,17α-dihydroxy-21-acetoxypregna-1,4-diene-3,20-dione, 1 g. of p-toluenesulfonic acid monohydrate, 50 ml. of acetic acid and 25 ml. of acetic anhydride is allowed to stand at room temperature for 24 hours, and then poured into water and stirred. This mixture is then extracted with methylene chloride and these extracts are dried and evaporated to yield 6α,7α - ethylene - 11β - hydroxy - 17α,21 - diacetoxypregna-1,4-diene-3,20-dione which is recrystallized from acetone:ether.

By repeating the above procedure with the 6β,7β-isomer, there is obtained the corresponding 6β,7β-ethylene-11β-hydroxy-17α,21-diacetoxypregna-1,4-diene-3,20-dione.

Utilizing the above procedure, the novel 17α-hydroxy-21-acetoxy compounds described herein, e.g. see Example 7, are treated with acetic anhydride, propionic anhydride, caproic anhydride, enanthic anhydride and cyclopentylpropionic anhydride to obtain for example, the 17α,21-diacetate, 17α-propionate-21-acetate, 17α-caproate-21-acetate, 17α-enanthate-21-acetate, and 17α-cyclopentylpropionate-21-acetate.

Example 10

A solution of 200 mg. of 6α,7α-ethylene-11β,17α-dihydroxy-21-acetoxypregn-4-ene-3,20-dione in 32 ml. of anhydrous isopropanol and 50 mg. of sodium borohydride is stirred at room temperature for 15 hours. One-hundred ml. of water is added and the resulting suspension extracted several times with ether. The ether extracts are combined, dried over sodium sulfate and evaporated to dryness under reduced pressure to yield 6α,7α-ethylene-3β,11β,17α-trihydroxy-21-acetoxypregn-4-en-20-one which may be further purified by recrystallization from ether.

Utilizing the procedure of Example 8, the latter compound is converted to the corresponding 6α,7α-ethylene- 3β-(tetrahydropyran-2'-yloxy) - 11β,17α - dihydroxy-21-acetoxypregn-4-en-20-one.

By repeating the above procedure with the 6β,7β-isomer, there is obtained the corresponding 3β-(tetrahydropyran-2'-yloxy)-6β,7β-ethylene-11β,17α - dihydroxy-21-acetoxypregn-4-en-20-one.

Utilizing the above procedure, the starting materials, namely:

6α,7α-tetrafluoroethylene-11β-hydroxy-16α,17α-isopropylidenedioxy-21-acetoxypregn-4-ene-3,20-dione;
6α,7α-ethylene-11β,17α-dihydroxy-16α-methyl-21-acetoxypregn-4-ene-3,20-dione; and
6α,7α-tetrafluoroethylene-9α-fluoro-11β,16α,17α-trihydroxy-21-acetoxypregn-4-ene-3,20-dione; are converted to the corresponding 3β-(tetrahydropyran-2'-yloxy) compounds, namely 3β-(tetrahydropyran-2'-yloxy)-6α,7α-tetrafluoroethylene-11β-hydroxy-16α,17α-isopropylidenedioxy-21-acetoxypregn-4-en-20-one, and the 6β,7β-isomer;
3β-(tetrahydropyran-2'-yloxy)-6α,7α-ethylene-11β,17α-dihydroxy-16α-methyl-21-acetoxypregn-4-en-20-one, and the 6β,7β-isomer;
3β-(tetrahydropyran-2'-yloxy)-6α,7α-tetrafluoroethylene-9α-fluoro-11β,16α,17α-trihydroxy-21-acetoxypregn-4-en-20-one, and the 6β,7β-isomer, respectively.

Example 11

A solution of 200 mg. of 6α,7α-tetrafluoroethylene-11β,21-dihydroxy - 16α,17α - isopropylidenedioxypregn-4-ene-3,20-dione in 32 ml. of anhydrous isopropanol and 25 mg. of sodium borohydride is stirred at room temperature for 15 hours. One-hundred milliliters of water is added and the resulting suspension extracted several times with ether. The combined ether extracts are dried over sodium sulfate and evaporated to dryness under reduced pressure to yield 6α,7α-tetrafluoroethylene-3β,11β,21-trihydroxy-16α,17α-isopropylidenedioxypregn-4-en-20-one which can be further purified by recrystallization from ether.

A mixture of 1 g. of 6α,7α-tetrafluoroethylene-3β,11β,21-trihydroxy - 16α,17α - isopropylidenedioxypregn-4-en-20-one, 4 ml. of pyridine and 2 ml. of acetic anhydride is allowed to stand at room temperature for 15 hours. The mixture is then poured into ice water and the precipitate which forms is collected by filtration, washed with water and dried to yield 3β,21-diacetoxy-6α,7α-tetrafluoroethylene-11β-hydroxy - 16α,17α - isopropylidenedioxypregn-4-en-20-one which can be further purified by recrystallization from acetone:hexane.

By repeating the above procedure with the 6β,7β-isomer, there is obtained the corresponding 3β,21-diacetoxy-6β,7β-tetrafluoroethylene-11β-hydroxy - 16α,17α-isopropylidenedioxypregn-4-en-20-one.

Utilizing the above procedure, the above 6α,7α- and 6β,7β-compounds containing a free hydroxy group at C-3 and C-21 are each separately treated with propionic anhydride, caproic anhydride, enanthic anhydride and cyclopentylpropionic anhydride, respectively, to yield the 3β,21-dipropionate, 3β,21-dicaproate, 3β,21-dienanthate, and 3β,21-cyclopentylpropionate of 6α,7α- and 6β,7β-tetrafluoroethylene - 3β,11β,21 - trihydroxy - 16α,17α - isopropylidenedioxypregn-4-en-20-one.

Example 12

A mixture of 2 g. of 6α, 7α-ethylene-11β,17α,21-trihydroxypregna-1,4-diene-3-20-dione in 8 ml. of pyridine and 4 ml. of trimethylacetyl chloride is heated at steam bath temperatures for one hour. The mixture is then poured into ice water. The solid which forms is collected by filtration, washed with water and dried to yield 6α,7α-ethylene-11β,17α-dihydroxy - 21 - trimethylacetoxypregna - 1,4-diene-3,20-dione.

By repeating the above procedure with the 6β,7β-isomer, there is obtained the corresponding 6β,7β-ethylene-11β,17α-dihydroxy-21 - trimethylacetoxypregna - 1,4-diene-3,20-dione.

Similarly, there are obtained from the corresponding starting materials the following final products, namely:

6α,7α - ethylene - 11β - hydroxy - 9α - fluoro - 16α,17α-isopropylidenedioxy - 21 - trimethylacetoxypregna - 1,4-diene-3,20-dione, and the 6β,7β-isomer; and
6α,7α - tetrafluoroethylene - 11β,17α - dihydroxy - 16α-methyl - 21 - trimethylacetoxypregna - 1,4 - diene - 3,20-dione, and the 6β,7β-isomer.

Example 13

A mixture of 2 g. of 9α-fluoro-11β,17α,21-trihydroxy-16α - methylpregna-4,6-diene-3,20-dione and 5 g. of 1,2-dichloroethylene in 70 ml. of dioxane and 70 ml. of benzene in a Pyrex container is irradiated with a 200 watt high pressure mercury vapor lamp at room temperature for a period of three hours. After the end of the reaction, the mixture of reaction products is evaporated to dryness to furnish a residue containing a 4α,5α-(1',2'-dichloro)-ethylene adduct, a 4β,5β-(1',2'-dichloro)ethylene adduct, a 4β,5α-(1',2'-dichloro)ethylene adduct, a 6α,7α-(1',2'-dichloro)ethylene adduct, and a 6β,7β-(1',2'-dichloro) ethylene adduct. The residue is separated by chromatography on silica eluting with ethyl acetate:benzene to yield 6α,7α-(1',2'-dichloro)ethylene - 9α - fluoro - 11β, 17α,21-trihydroxy - 16α - methylpregn - 4 - ene - 3,20-dione, and 6β,7β - (1',2' - dichloro)ethylene - 9α - fluoro-11β,17α,21 - trihydroxy - 16α - methylpregn - 4 - ene-3,20-dione, each of which is recrystallized from methanol:methylene chloride.

Utilizing the above procedure, the following starting materials are reacted with the following olefins to afford the 6α,7α-substituted and 6β,7β-substituted ethylene derivatives as indicated below.

| Starting material | Olefin | Final product |
| --- | --- | --- |
| 11β,21-dihydroxy-16α-methylpregna-4,6-diene-3,20-dione. | Stilbene | 6α,7α-(1',2'-diphenyl)-ethylene-11β,21-dihydroxy-16α-methylpregn-4-ene-3,20-dione and the 6β,7β-isomer. |
| 11β,17α,21-trihydroxy-16α-methylpregna-4,6-diene-3,20-dione. | α,α'-difluoro stilbene. | 6α,7α-(1',2'-difluoro-1',2'-diphenyl)ethylene-11β,17α,21-trihydroxy-16α-methylpregn-4-ene-3,20-dione, and the 6β,7β-isomer. |
| 9α-fluoro-11β,21-dihydroxy-16α-methylpregna-4,6-diene-3,20-dione. | 1,2-dichloro-ethylene. | 6α,7α-(1',2'-dichloro)-ethylene-9α-fluoro-11β,21-dihydroxy-16α-methylpregn-4-ene-3,20-dione, and the 6β,7β-isomer. |

Example 14

To a solution of 5 g. of 11β,17α,21-trihydroxypregna-4,6-diene-3,20-dione in 200 ml. of chloroform are added 40 ml. of 37% aqueous formaldehyde and 5 ml. of concentrated hydrochloric acid. The mixture is stirred for 48 hours at room temperature and the two layers then separated. The aqueous layer is extracted with chloroform and the combined organic layer and chloroform extracts are washed with water to neutrality, dried over sodium sulfate and evaporated to dryness to yield 11β-hydroxy-17,20:20,21-bismethylenedioxypregna - 4,6 - dien - 3 - one which is recrystallized from methanol:ether.

A mixture of 2.0 g. of 11β-hydroxy-17,20:20,21-bismethylenedioxypregna - 4,6 - dien-3-one in 140 ml. of benzene is irradiated with a 70 watt Hanau high pressure mercury vapor lamp with a Pyrex filter at room temperature for a period of several hours while bubbling ethylene through the solution. At the end of the reaction time, which may be followed by the U.V. spectra, the reaction product is evaporated in vacuo to dryness, chromatographed on silica eluting with ethylacetate:benzene to yield 6α,7α-ethylene - 11β - hydroxy - 17,20:20,21 - bis-methylenedioxypregn-4-en-3-one which is recrystallized from methanol:methylene chloride.

One gram of 6α,7α - ethylene - 11β - hydroxy - 17,20:20,21-bismethylenedioxypregn - 4 - en - 3 one in 100 ml. of 80% acetic acid under nitrogen for seven hours. The mixture is then concentrated under vacuum to a small volume and poured into water. The solid which forms is collected by filtration washed well with water dried and recrystallized from acetone:hexane to yield 6α,7α-ethylene-11β,17α,21-trihydropregn-4-ene-3,20-dione.

What is claimed is:
1. A compound of the formula:

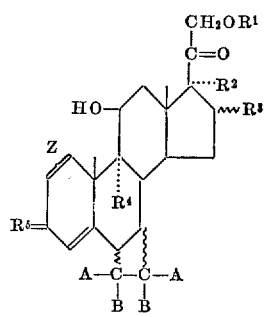

wherein:
$R^1$ is hydrogen, tetrahydropyran-2'-yl, phosphono or a hydrocarbon carboxylic acyl group containing less than 12 carbon atoms;
$R^2$ is hydrogen, hydroxy or a hydrocarbon carboxylic acyloxy group of less than 12 carbon atoms;
$R^3$ is hydrogen, α-methyl, β-methyl, α-fluoro, α-hydroxy or α-hydrocarbon carboxylic acyloxy group of less than 12 carbon atoms;
$R^2$ and $R^3$ together is the group

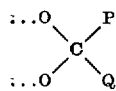

in which P is hydrogen or lower alkyl and Q is hydrogen, lower alkyl or aryl;
$R^4$ is hydrogen or fluoro;
$R^5$ is keto or the group

in which $R^6$ is hydrogen, tetrahydropyran-2'-yl or a hydrocarbon carboxylic acyl group of less than 12 carbon atoms;
Z is a carbon-carbon single bond or a carbon-carbon double bond, $R^5$ being keto when Z is a carbon-carbon double bond;
A is hydrogen or fluoro; and
B is hydrogen, fluoro, chloro, methyl or phenyl.

2. A compound according to claim 1 wherein $R^1$ is hydrogen, acetyl or trimethylacetyl; $R^2$ is hydrogen or hydroxy; $R^3$ is hydrogen, α-methyl, α-hydroxy or $R^2$ and $R^3$ together is the group

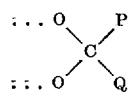

in which each of P and Q is methyl; and each of A and B is hydrogen or fluoro.

3. A compound according to claim 2 wherein $R^1$ is hydrogen; $R^2$ is hydroxy; $R^3$ is α-methyl; $R^4$ is hydrogen; $R^5$ is keto; Z is a carbon-carbon double bond; and each of A and B is hydrogen.

4. A compound according to claim 2 wherein $R^1$ is hydrogen; $R^2$ and $R^3$ together is the group

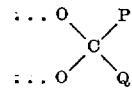

in which each of P and Q is methyl; $R^4$ is hydrogen; $R^5$ is keto; Z is a carbon-carbon double bond; and each of A and B is hydrogen.

5. A compound according to claim 2 wherein $R^1$ is hydrogen; $R^2$ is hydroxy; $R^3$ is α-methyl; $R^4$ is fluoro; $R^5$ is keto; Z is a carbon-carbon double bond; and each of A and B is hydrogen.

6. A compound according to claim 2 whether $R^1$ is hydrogen; $R^2$ and $R^3$ together is the group

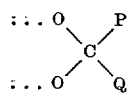

wherein each of P and Q is methyl; $R^4$ is fluoro; $R^5$ is keto; Z is a carbon-carbon double bond; and each of A and B is hydrogen.

7. A compound according to claim 2 wherin $R^1$ is hydrogen; $R^2$ is hydroxy; $R^3$ is α-methyl; $R^4$ is fluoro; $R^5$ is keto; Z is a carbon-carbon double bond; and each of A and B is fluoro.

8. A compound according to claim 2 wherein $R^1$ is hydrogen; $R^2$ and $R^3$ together is the group

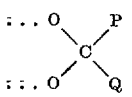

wherein each of P and Q is methyl; $R^4$ is fluoro; $R^5$ is keto; Z is a carbon-carbon double bond; and each of A and B is fluoro.

9. A compound according to claim 2 wherein $R^1$ is hydrogen; $R^2$ is hydroxy; $R^3$ is α-methyl; $R^4$ is hydrogen; $R^5$ is keto; Z is a carbon-carbon double bond; and each of A and B is fluoro.

10. A compound according to claim 2 wherein $R^1$ is hydrogen; $R^2$ and $R^3$ together is the group

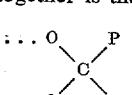

wherein each of P and Q is methyl; $R^4$ is hydrogen; $R^5$ is keto; Z is a carbon-carbon double bond; and each of A and B is fluoro.

11. A compound according to claim 2 wherein each of $R^1$, $R^2$ and $R^4$ is hydrogen; $R^3$ is α-methyl; $R^5$ is keto; Z is a carbon-carbon single bond; and each of A and B is hydrogen.

12. A compound according to claim 2 wherein each of $R^1$, $R^2$ and $R^4$ is hydrogen; $R^3$ is α-methyl; $R^5$ is keto; Z is a carbon-carbon double bond; and each of A and B is hydrogen.

13. A compound according to claim 2 wherein each of $R^1$ and $R^2$ is hydrogen; $R^3$ is α-methyl; $R^4$ is fluoro; $R^5$ is keto; Z is a carbon-carbon single bond; and each of A and B is hydrogen.

14. A compound according to claim 2 wherein each of $R^1$ and $R^2$ is hydrogen; $R^3$ is α-methyl, $R^4$ is fluoro; $R^5$ is keto; Z is a carbon-carbon double bond; and each of A and B is hydrogen.

15. A compound according to claim 2 wherein each of $R^1$, $R^2$ and $R^4$ is hydrogen; $R^3$ is α-methyl; $R^5$ is keto; Z is a carbon-carbon single bond; and each of A and B is fluoro.

16. A compound according to claim 2 wherein each of $R^1$, $R^2$ and $R^4$ is hydrogen; $R^3$ is α-methyl; $R^5$ is keto; Z is a carbon-carbon double bond; and each of A and B is fluoro.

17. A compound according to claim 2 wherein each of $R^1$ and $R^2$ is hydrogen; $R^3$ is α-methyl; $R^4$ is fluoro; $R^5$ is keto; Z is a carbon-carbon single bond; and each of A and B is fluoro.

18. A compound according to claim 2 wherein each of $R^1$ aid $R^2$ is hydrogen; $R^3$ is α-methyl; $R^4$ is fluoro; $R^5$ is keto; Z is a carbon-carbon double bond; and each of A and B is fluoro.

References Cited

UNITED STATES PATENTS 3,356,677  12/1967  Beard et al.

HENRY A. FRENCH, Primary Examiner

U.S. Cl. X.R.

204—158; 260—397.45, 999